Feb. 29, 1944.   W. C. GRABAU   2,342,657
MOTOR SPEED REGULATOR
Filed May 6, 1942
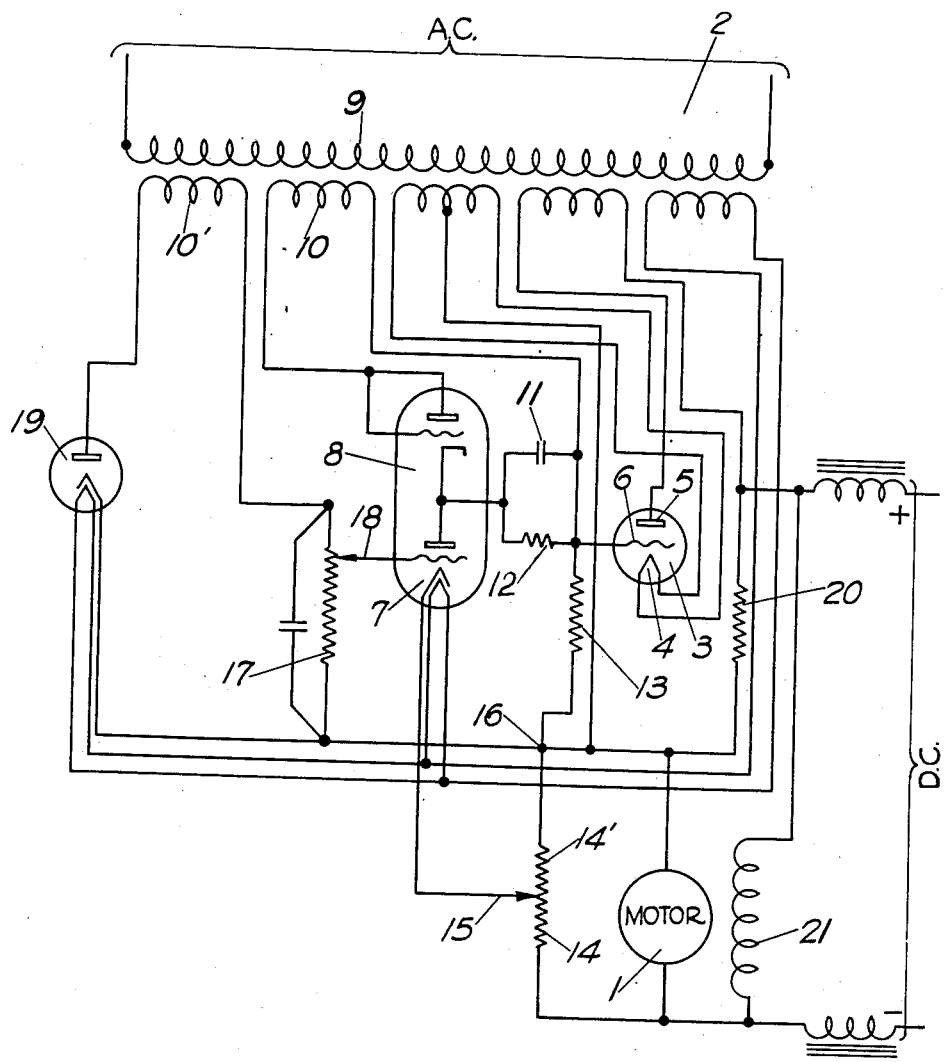
INVENTOR
WILLIAM C. GRABAU
BY
ATTORNEY Patented Feb. 29, 1944

2,342,657

UNITED STATES PATENT OFFICE 2,342,657

MOTOR SPEED REGULATOR

William Christian Grabau, Brighton, Mass., assignor to Submarine Signal Company, Boston, Mass., a corporation of Maine Application May 6, 1942, Serial No. 441,981

3 Claims. (Cl. 172—239)

The present invention relates to control of electrical apparatus and more particularly to the operation of a motor with direct current with the control apparatus energized in part from an alternating current source and in these respects is a modification of my copending application Serial No. 432,982, filed March 2, 1942.

The present invention is particularly useful when it is desired to associate the control circuit with a high frequency alternating current source. In systems, for example, where the alternating current source circuit may be of the order of 500 cycles or more, such systems have found particular use in association with radio apparatus and alternating current supply sources for the purpose of transmission and reception.

Without further describing the merits and advantages of the present invention, the invention will be described in connection with the circuit diagram illustrating the embodiment of the invention.

In this circuit, 1 is a direct current motor which is supplied with power by a direct current source labelled D. C. in the drawing. An alternating current source 2 is also used in the system and this supplies various voltage sources as will be explained later. In series with the motor 1 is a controlling resistor 20, the motor and the resistor 20 being connected in series across the direct current supply lines. The motor 1 may also be provided with a motor field 21 shunted across the direct current lines. A circuit for shunting in and out the resistor 20 and thereby lowering or increasing the speed of the motor 1 is used which is similar in many respects to that of my copending application mentioned above.

In the present application the gaseous control and rectifier tube 3, which may be of the so-called "Thyratron" type, is provided with a cathode 4, an anode 5 and a control grid 6. This tube may be operable on a magnitude 3 volts negative bias applied to the grid 6 which will hold off a discharge of the tube for 440 volts alternating current applied between the cathode and the anode of the tube, or it may be operable on a much lower voltage, particularly in the circuit of the present invention where only a part of the direct current supply line is impressed across the resistor 20. The bias on the grid 6 of the gaseous tube 3 is controlled through the thermionic control tube circuit. This includes a twin triode tube one section of which is used as a triode control 7 having a cathode, anode and grid electrodes, and a second triode section 8 in which the grid and the plate are connected together forming thereby a simple thermionic rectifier valve. Alternating current is supplied to the transformer 9 the secondary of which has various windings which will presently be described. One secondary winding 10 supplies power to the cathode-anode circuit of the triode section 8. In this cathode-anode circuit there is a shunt circuit comprising a condenser 11 and a resistor 12. The anode-cathode circuit of the triode control portion 7 comprises the shunt circuit formed by the condenser 11 and the resistor 12, which shunt circuit is in series with the resistor 13. There is also in this anode-cathode circuit a portion of the shunt motor resistance 14 which has an adjustable tap 15 which is connected to the cathode of the tube 7. The point 16 between the resistors 13 and 14 is connected to the positive side of the grid biasing resistance 17 to which the grid of the tube 7 is connected through the adjustable tap 18 so that the resistance 17 furnishes a negative bias component for the grid of the tube 7. Rectified direct current is supplied to the resistance 17 by means of the rectifier 19 which may be of the full-wave type, if desired. This rectifier is energized through the secondary 10' of the transformer 9, although, if desired, and if the direct current supply is sufficiently constant, the resistance 17 may be directly supplied from the direct current source. The variation in position of the adjustable tap 18 supplies the control for varying the speed of the motor. This control in combination with the control of the adjustable tap 15 supplies a complete control for the speed and torque in the operation of the motor. The adjustment of the adjustable tap 15, which determines what portion 14' of the resistance 14 will be connected in the grid circuit of the triode section 7 primarily as explained in my said copending application, controls the magnitude of motor torque while the adjustment of the adjustable tap 18 primarily provides the control for the speed characteristic. The operation of the circuit is also similar to that described in my copending application.

When the resistor 20 is in circuit with the motor and not shunted by the thyratron control tube 3, the motor speed and torque both tend to be decreased. Depending upon the adjustment of the taps 15 and 18, the chosen values for torque and speed are respectively determined.

As the speed of the motor increases due to lightening of the load, for instance, the positive bias will increase in the portion 14' of the resistor 14, thus reducing the negative bias and causing the thermionic control tube 7 to permit an earlier passage of current in the alternating current cycle as applied across the resistor 12 and also a passage of more current during the entire cycle. This tends, of course, to establish a more negative bias on the resistance 13 as applied to the grid 6 of the gaseous control tube 3 and therefore holds off for a longer period the firing of the tube 3, thus reducing the energy applied to the motor 1 and thereby reducing its speed.

If, however, it is desired to operate the motor with a higher torque for the same speed, the positive bias adjustment 15 on the resistor 14 will be increased and the negative bias adjustment 18 also increased to re-establish the desired grid bias difference corresponding to the chosen motor speed. This increase of the positive bias will operate to produce a greater correction factor with a smaller change in motor speed; that is, if the motor speed, for instance, is decreased 10%, the positive bias would also be decreased 10%, but if the positive bias were set at a higher value than previously, then the actual voltage decrease would be greater than in the initial instance. The grid of the gaseous control tube will therefore respond more quickly to bring the speed back to the desired normal condition. The result is that for the same motor speed with increased load, a larger decrease of the positive bias will occur, thus permitting a higher negative bias on the vacuum control tube 7, and an earlier shut-off of current in the anode-cathode tube of the circuit 7 and therefore an earlier collapse of the voltage across the resistor 13. The torque, therefore, may be raised, at the same time maintaining the same motor speed.

It is also possible to have a rising speed characteristic from no-load to full-load operation. In this case the gaseous control tube 3 will be operated with the tube not fully opened for a point corresponding to normal full load at normal speed. If under this condition the adjustment 15 on the resistor 14 is positioned so that the positive bias is considerably increased over normal and the negative bias 18 adjusted to produce the desired negative bias for full-load over-speed conditions, then the tube will have a tendency to fire earlier in the cycle depending upon the change in speed produced by the load when the motor was not receiving any power. In other words, if the load produces a tendency of slowing down the motor rapidly after the power is removed, the current will come on comparatively earlier and tend to maintain a higher speed than that under normal operation. In the present case, therefore, both constant speed and increasing speed curves may be obtained from no load to full load and greater than full-load torque.

The control of the motor speed is primarily obtained through positioning of the adjustable arm 18. An increase in the negative bias applied from the resistor 17 will make it necessary for the motor to speed up to balance the drop in that portion 14' of the resistance 14 in order to permit current flow in the cathode-anode circuit of the tube 7 and hold back the discharge of the tube 3. Until the negative bias provided by the resistor 17 is overcome by the increase in motor speed, the tube will fire early in the cycle and permit therefore full power to flow through the motor armature.

It will be seen that an increase in motor load will result in a more negative bias on the grid tap 18 and a less negative bias on the grid 6 of the thyratron tube 3 which will thereupon short out the resistor 20 placing the full direct current across the motor.

The regulation of the gaseous control tube 3 and its control by means of the vacuum triode 7 takes place in accordance with the explanation set forth in my copending application mentioned above as described in connection with Fig. 3 of that application. In the present case the motor is a direct current motor run from a direct current source and the regulation in speed and torque is such that regardless of the frequency of the alternating current the same accuracy and uniformity of control may be obtained.

Having now described my invention, I claim:

1. A system for operating a motor over a desired speed range by means of a direct current motor supply source and an alternating current auxiliary source which comprises a gaseous control tube and circuit, said tube having a grid control element and means controlling the voltage impressed upon the grid control element including a thermionic vacuum tube and means providing during the positive half of the alternating current cycle a rapid decrease in grid bias potential on the grid of said gaseous control tube from a potential of large magnitude to a potential of a magnitude comparable with the critical grid voltage for the discharge of said control tube, said gaseous control tube being supplied both from said direct current and alternate current sources in series with each other and said rapid decrease occurring during the positive half of the cycle applied to said control tube, the means supplying said direct current source being in common in the direct current circuit of the motor and said gaseous control circuit.

2. A system for operating a motor over a desired speed range from a direct current supply source and an auxiliary alternating current control circuit which comprises means connected in the direct current supply for varying the potential for said motor and means shunting said first means including a gaseous control tube and circuit having a cathode-anode circuit energized in part by said alternating current source and means responsive to motor speed and torque variations for controlling the discharge of said gaseous control tube whereby said first-named means may be shunted in and out of said direct current supply for controlling the speed and torque of said motor.

3. A system for operating a motor over a desired speed range from a direct current supply source and an auxiliary alternating current control circuit which comprises means connected in the direct current supply for varying the potential for said motor and means shunting said first means including a gaseous control tube and circuit having a cathode-anode circuit with a grid control electrode energized in part by said alternating current source and means responsive to motor speed and torque variations for controlling the discharge of said gaseous control tube whereby said first-named means may be shunted in and out of said direct current supply for controlling the speed and torque of said motor, said means including a thermionic vacuum tube source providing during the positive half of the alternating current cycle a rapid decrease in grid bias potential on the grid of said gaseous control tube from a potential of large magnitude to a potential of magnitude comparable with the critical grid voltage for discharging said control tube, said rapid decrease occurring during the positive half of the alternating cycle applied to said control tube.

WILLIAM CHRISTIAN GRABAU.